(12) United States Patent
Chizuwa

(10) Patent No.: US 11,652,403 B2
(45) Date of Patent: May 16, 2023

(54) SWITCHING POWER SOURCE DEVICE, VEHICLE, AND CONTROL METHOD

(71) Applicant: Panasonic Intellectual Property Management Co., Ltd., Osaka (JP)

(72) Inventor: Shuhei Chizuwa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/395,039

(22) Filed: Aug. 5, 2021

(65) Prior Publication Data

US 2022/0060104 A1 Feb. 24, 2022

(30) Foreign Application Priority Data

Aug. 21, 2020 (JP) .............................. JP2020-140424
Jun. 22, 2021 (JP) .............................. JP2021-103268

(51) Int. Cl.
*H02M 1/42* (2007.01)
*H02M 1/14* (2006.01)
*H02M 7/217* (2006.01)
*H02M 3/158* (2006.01)

(52) U.S. Cl.
CPC ......... *H02M 1/4225* (2013.01); *H02M 1/143* (2013.01); *H02M 3/158* (2013.01); *H02M 7/2173* (2013.01)

(58) Field of Classification Search
CPC ...... H02J 3/38; H02J 9/04; H02J 9/06; H02M 7/062; H02M 7/08; H02M 7/125; H02M 7/153; H02M 7/1555; H02M 7/1557; H02M 7/1626; H02M 7/17; H02M 7/2195; H02M 7/23; H02M 7/2127; H02M 3/1584;
(Continued)

(56) References Cited

U.S. PATENT DOCUMENTS

2002/0145895 A1* 10/2002 Liu .......................... H02J 1/102
363/65
2019/0036462 A1* 1/2019 Tazaki ..................... H02M 7/06
(Continued)

FOREIGN PATENT DOCUMENTS

| JP | 2020-140424 A | 9/2020 |
|---|---|---|
| JP | 2021-103268 A | 7/2021 |
| WO | 2019/131620 A1 | 7/2019 |

*Primary Examiner* — Nguyen Tran
(74) *Attorney, Agent, or Firm* — Seed IP Law Group LLP

(57) ABSTRACT

A switching power source device includes a plurality of power source circuits including a first power source circuit corresponding to a first phase of an external power source, and a second power source circuit corresponding to a second phase of the external power source that is different from the first phase; a first switching circuit capable of switching between a plurality of connection modes including a first mode of connecting the second power source circuit to the first phase in parallel with the first power source circuit, and a second mode of connecting the second power source circuit to the second phase; a memory; and a hardware processor coupled to the memory, the hardware processor being configured to open and close a switching element included in the first power source circuit and a switching element included in the second power source circuit, in different phases in the first mode.

11 Claims, 11 Drawing Sheets

(58) Field of Classification Search
CPC ............. H02M 3/285; H02M 3/33561; H02M 1/4225; H02M 1/4216; H02M 1/143; H02M 1/084
See application file for complete search history.

(56) References Cited

U.S. PATENT DOCUMENTS

2019/0115779 A1\* 4/2019 Jang .......................... H02J 7/06
2020/0323101 A1 10/2020 Tazaki et al.

\* cited by examiner

SWITCHING POWER SOURCE DEVICE, VEHICLE, AND CONTROL METHOD

CROSS-REFERENCE TO RELATED APPLICATIONS

This application is based upon and claims the benefit of priority from Japanese Patent Application No. 2020-140424, filed on Aug. 21, 2020 and Japanese Patent Application No. 2021-103268, filed on Jun. 22, 2021, the entire contents of which are incorporated herein by reference.

FIELD

The present disclosure relates to a switching power source device, a vehicle, and a control method.

BACKGROUND

There has been conventionally known a switching power source device that can convert alternating-current power from single-phase and polyphase alternating-current power sources into direct-current power (for example, WO 2019/131620 A).

In a switching power source device disclosed in WO 2019/131620 A, three power conversion lines each including a noise filter, a power factor improvement circuit, and a power converter are arranged in parallel.

The switching power source device charges a battery by connecting a power conversion line corresponding to each phase, to an external alternating-current power source in accordance with the number of phases of a connected alternating-current power source.

Furthermore, as in WO 2019/131620 A, a power factor improvement circuit generally employs an interleave method in which two coils, two switching elements, and two diodes are provided, for the purpose of reducing a ripple current.

However, in the configuration of a conventional switching power source device, because each line requires two coils, two switching elements, and two diodes, the device upsizes.

A problem to be solved by the present disclosure is to suppress the upsizing of a device without increasing a ripple current.

SUMMARY

A switching power source device according to an aspect of the present disclosure includes a plurality of power source circuits, a first switching circuit, a memory, and a hardware processor coupled to the memory. The plurality of power source circuits correspond to phases of a polyphase alternating-current power source being an external power source. Each of the plurality of power source circuits includes a power factor improvement circuit including an inductor, a switching element, and a diode. The plurality of power source circuits includes a first power source circuit corresponding to a first phase of the external power source, and a second power source circuit corresponding to a second phase of the external power source that is different from the first phase. The first switching circuit is capable of switching between a plurality of connection modes including a first mode of connecting the second power source circuit to the first phase in parallel with the first power source circuit, and a second mode of connecting the second power source circuit to the second phase. The hardware processor is configured to open and close a switching element included in the first power source circuit and a switching element included in the second power source circuit, in different phases in the first mode.

DETAILED DESCRIPTION

First Embodiment

Figure 1:
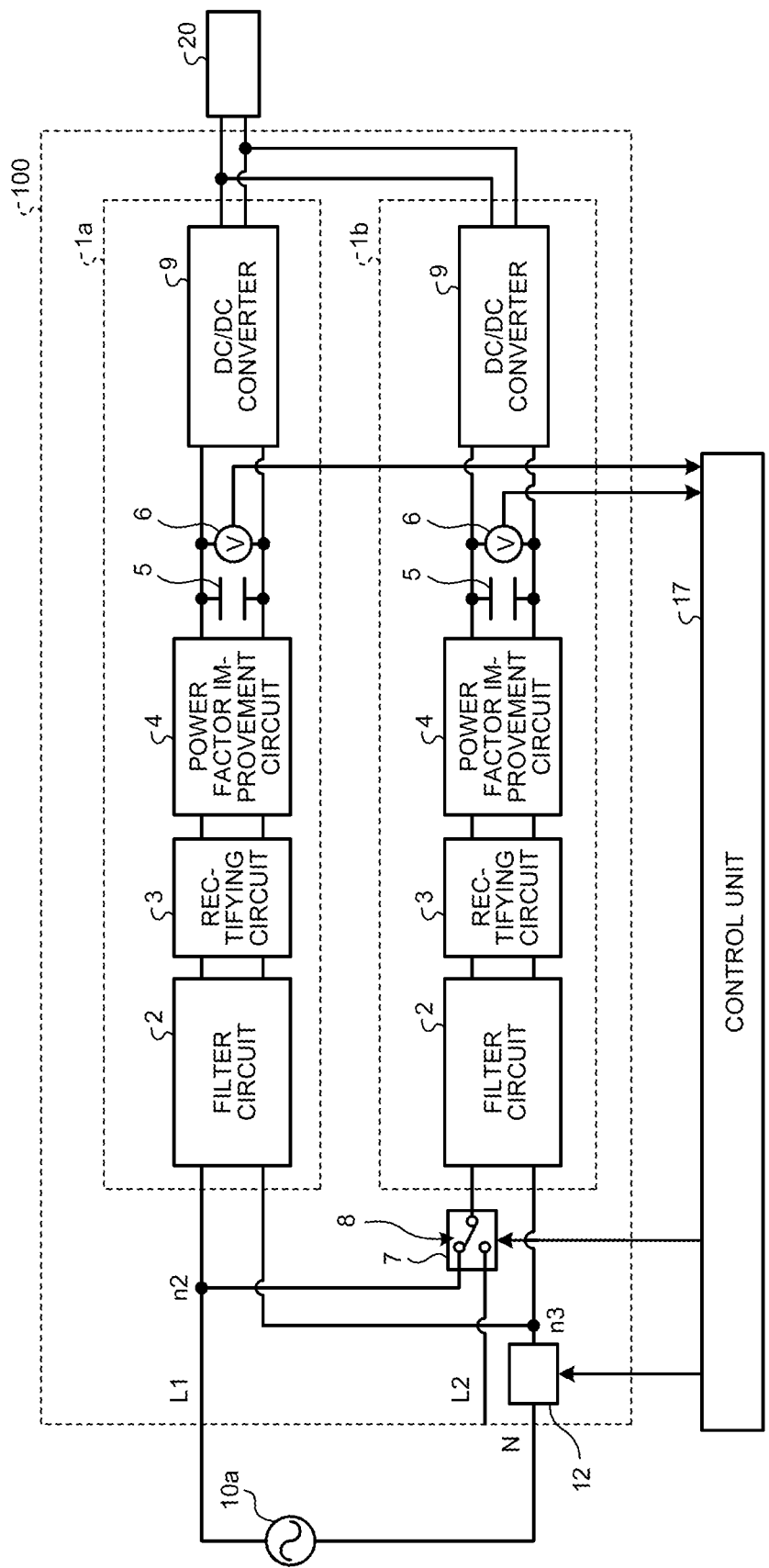
FIG. 1 is a circuit diagram illustrating a case where a switching power source device according to a first embodiment is connected with a single-phase alternating-current power source.

First of all, an example of a configuration of a switching power source device 100 of the present embodiment will be described. The switching power source device 100 can also be referred to as a switching power source circuit. FIG. 1 is a circuit diagram illustrating a configuration example of the switching power source device 100. The switching power source device 100 is used in a charging device of a vehicle such as an electric automobile or a hybrid automobile, for example.

Configuration of Switching Power Source Device 100

Figure 2:
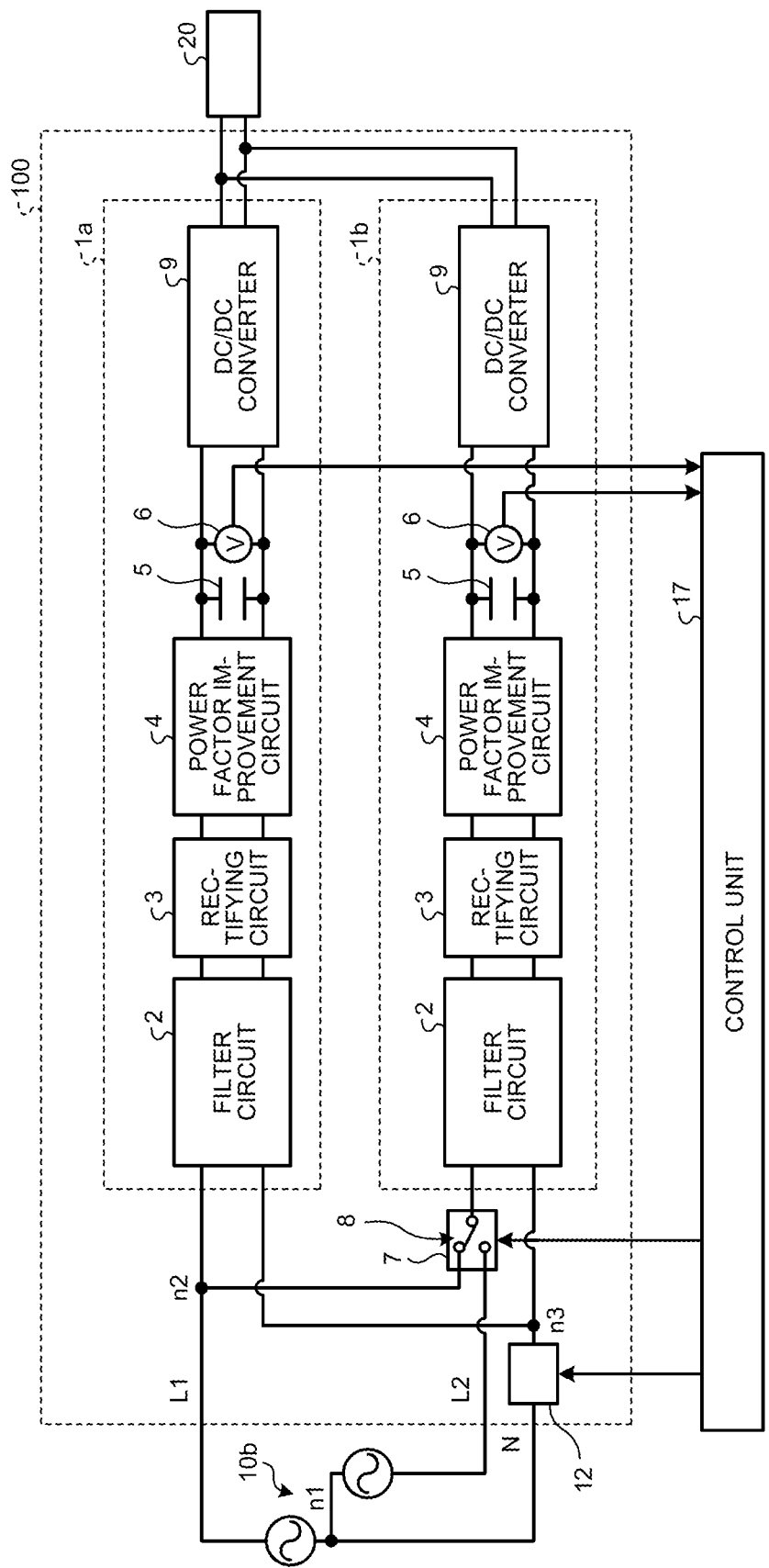
FIG. 2 is a circuit diagram illustrating a case where the switching power source device according to the first embodiment is connected with a two-phase alternating-current power source.
Figure 3:
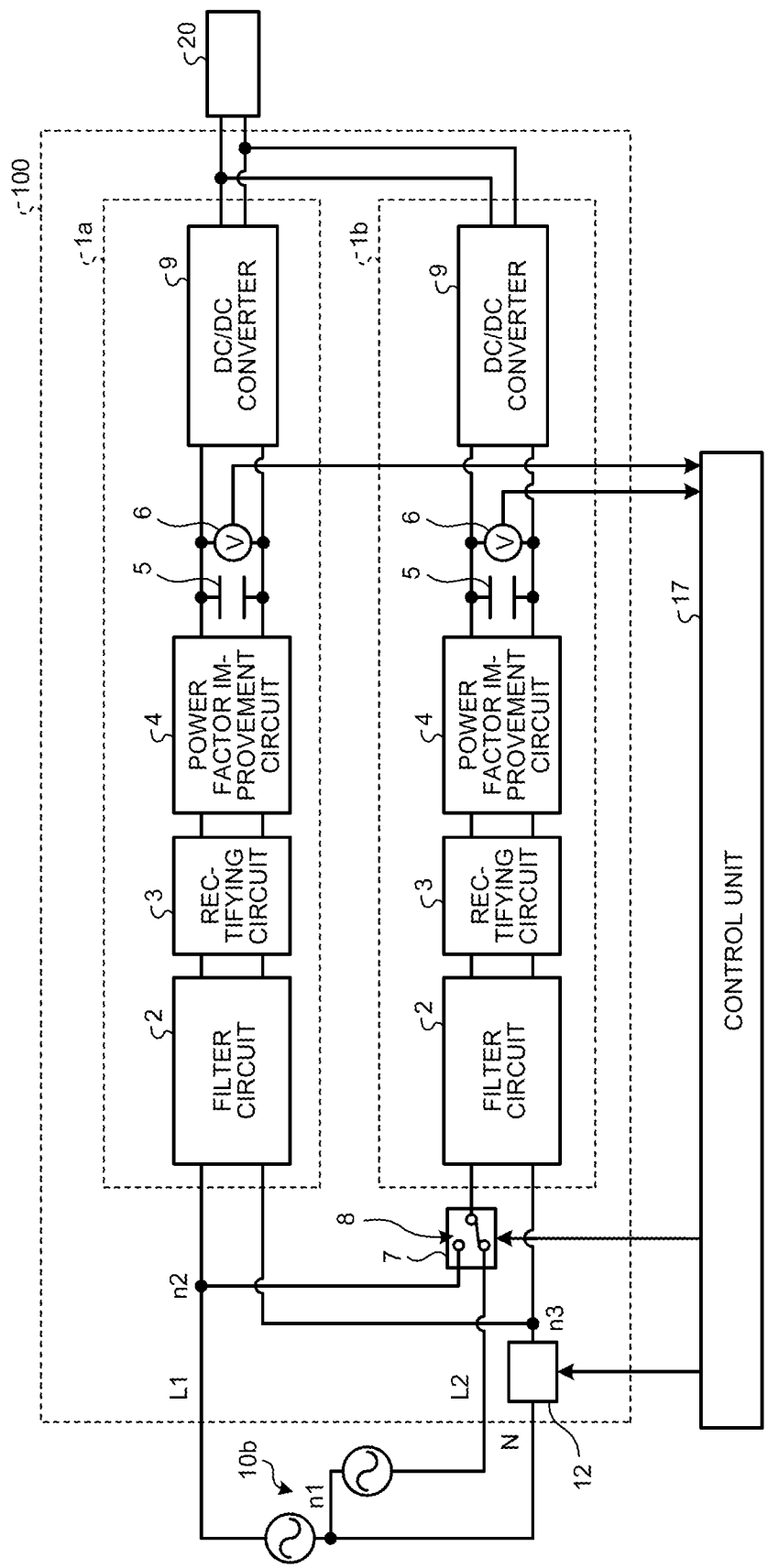
FIG. 3 is a circuit diagram illustrating a case where the switching power source device according to the first embodiment is connected with a two-phase alternating-current power source.

The switching power source device 100 is a device that converts alternating-current power from an alternating-current power source into direct-current, and outputs it to a battery 20. FIG. 1 illustrates, as an example, a case where the switching power source device 100 is connected to a single-phase alternating-current power source 10a, but the switching power source device 100 may be connected to a two-phase alternating-current power source 10b as illustrated in FIGS. 2 and 3. In the switching power source device 100 of the present embodiment, the single-phase alternating-current power source 10a and the two-phase alternating-current power source 10b (a three-phase alternating-current power source 10c to be described later) will also be simply described as an "alternating-current power source" in a case where they are not distinguished from each other. Furthermore, the two-phase alternating-current power source 10b and the three-phase alternating-current power source 10c will also be described as "polyphase alternating-current power source".

The battery 20 is a battery for driving a motor of a vehicle, for example. The battery 20 is a high-power battery, and examples thereof include a lithium-ion battery, for example. Note that the battery 20 may be a battery used in such as a mobile phone or an electric appliance other than a vehicle.

The switching power source device 100 includes a power source circuit 1a, a power source circuit 1b, a switching circuit 7, a rush current prevention circuit 12, and a control unit 17. In the present embodiment, the switching power source device 100 has a configuration including two power source circuits (the power source circuits 1a and 1b) for adapting to the single-phase alternating-current power source 10a and the two-phase alternating-current power source 10b. The switching circuit 7 is an example of a first switching circuit in the appended claims.

The power source circuits 1a and 1b each include a filter circuit 2, a rectifying circuit 3, a power factor improvement circuit 4, a capacitor 5, and a DC/DC converter 9. Furthermore, each of the power source circuits 1a and 1b is connected to an alternating-current power source via a power line L1 or L2.

Alternating-current power is input to the filter circuit 2 from the alternating-current power source. The filter circuit 2 suppresses noise intrusion to a power line and noise leakage to an external alternating-current power source.

The rectifying circuit 3 performs full-wave rectification of alternating-current power input from the filter circuit 2 and converts the alternating-current power into direct-current power, and outputs it to the power factor improvement circuit 4. The rectifying circuit 3 is a diode bridge circuit including four diodes (not illustrated).

Figure 4:
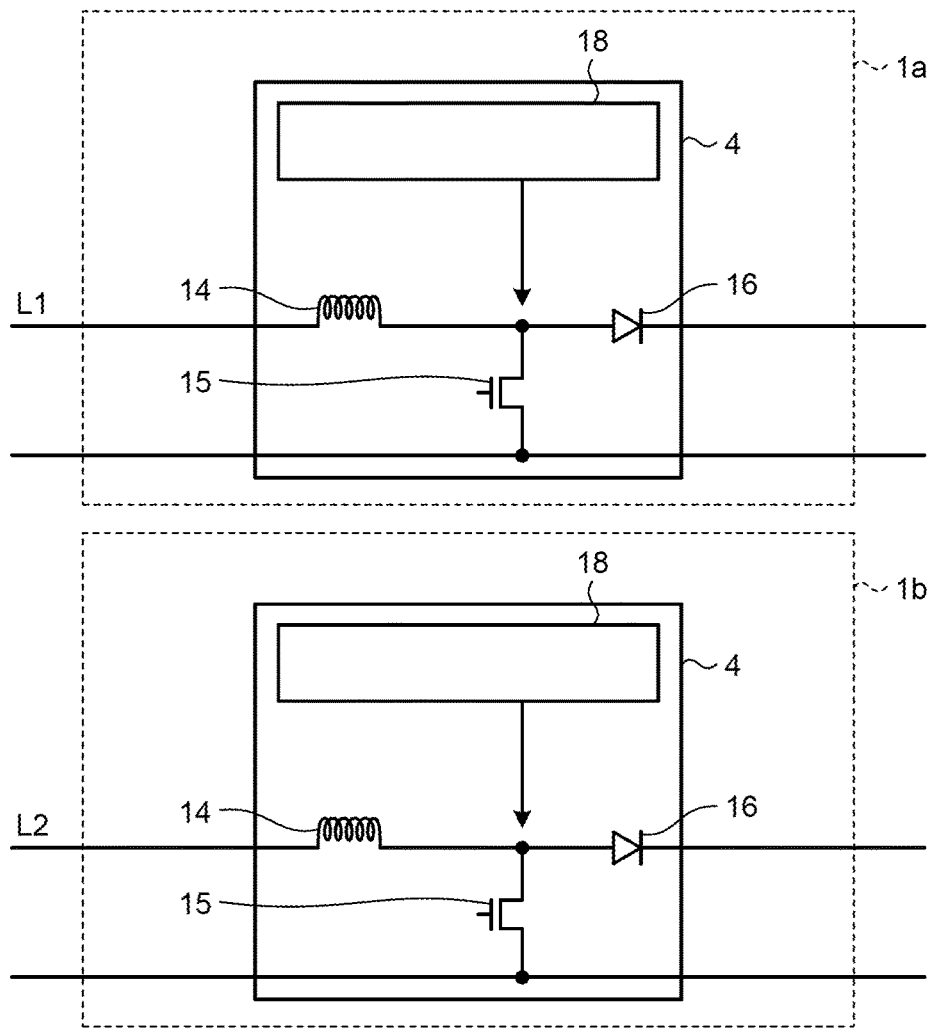
FIG. 4 is a diagram illustrating a configuration example of a power factor improvement circuit of the switching power source device according to the first embodiment.

The power factor improvement circuit 4 is a circuit having a function of improving a power factor of power input from the rectifying circuit 3, and increasing a voltage of input power. As illustrated in FIG. 4, the power source circuits 1a and 1b each include the power factor improvement circuit 4 including a coil 14, a switching element 15, and a diode 16. Here, the coil 14 is an example of an inductor in the appended claims.

A power factor improvement control unit 18 controls opening and closing of the switching element 15 included in each power source circuit. The power factor improvement control unit 18 is included in each power source circuit. The power factor improvement control unit 18 is an example of a first control unit in the appended claims. A specific function will be described later.

The power factor improvement circuit 4 forms the power factor improvement circuit 4 employing a so-called single method in which one coil 14, one switching element 15, and one diode 16 are provided. Thus, as compared with a power factor improvement circuit employing an interleave method in which two coils, two switching elements, and two diodes are provided, it is possible to reduce the number of components, and it is consequently possible to downsize the device and reduce manufacturing cost. Note that, even with the power factor improvement circuit 4 employing the single method like this configuration, it becomes possible to reduce a ripple current similarly to the conventional interleave method, by the control to be described in detail with reference to FIG. 6.

The capacitor 5 is connected to an output of the power factor improvement circuit 4, and smooths direct-current power output from the power factor improvement circuit 4. Because a voltage of the direct-current power is increased by the power factor improvement circuit 4, the capacitor 5 has relatively large capacity capacitor such as in an electrolytic capacitor, for example. Furthermore, a voltmeter 6 that measures a voltage of the capacitor 5 is connected in parallel with the capacitor.

When initial charge (pre-charge) of the capacitor 5 is performed, the voltmeter 6 measures a voltage of the capacitor 5. A voltage value measured by the voltmeter 6 is output to the control unit 17. The voltmeter 6 is provided in each of the power source circuits 1a and 1b.

By detecting a voltage value of the voltmeter 6, the control unit 17 can determine which of the single-phase alternating-current power source 10a and the two-phase alternating-current power source 10b the switching power source device 100 is connected to. Note that a new voltmeter other than the voltmeter 6 may be separately provided, and the control unit 17 may determine which of the single-phase alternating-current power source 10a and the two-phase alternating-current power source 10b the switching power source device 100 is connected to. Here, the control unit 17 is an example of a second control unit in the appended claims.

The voltmeter 6 is not an essential configuration in the present embodiment. For example, a current sensor may be separately provided in the power factor improvement circuit 4, and a current value may be output to the control unit 17. This enables the control unit 17 to determine which of the single-phase alternating-current power source 10a and the two-phase alternating-current power source 10b the switching power source device 100 is connected to, without using the voltmeter 6. Note that, in a case where a current sensor is separately provided, an installation location of the current sensor is not limited to the inside of the power factor improvement circuit 4.

Furthermore, as another method, a communication unit that performs communication with an alternating-current power source may be provided, and the control unit 17 may determine which of the single-phase alternating-current power source 10a and the two-phase alternating-current power source 10b the switching power source device 100 is connected to, on the basis of information regarding the alternating-current power source that has been transmitted from the communication unit.

The DC/DC converter 9 is a circuit that converts an output from the power factor improvement circuit 4 into a voltage that can charge the battery 20.

The switching circuit 7 can be switched between a plurality of connection modes including a first mode of connecting the power source circuit 1b (second power source circuit) to a first phase (power line L1) in parallel with the power source circuit 1a (first power source circuit), and a second mode of connecting the power source circuit 1b (second power source circuit) to a second phase (power line L2).

In other words, the switching circuit 7 can switch a connection destination of a different power source circuit (the power source circuit 1b) other than a specific power source circuit (the power source circuit 1a) corresponding to a specific phase (for example, power line L1) of a polyphase alternating-current power source, out of the plurality of power source circuits 1a and 1b, to a phase (power line L2) corresponding to the different power source circuit (the power source circuit 1b) or the specific phase (power line L1).

The switching circuit 7 is controlled to be in the first mode in FIGS. 1 and 2, and to be in the second mode in FIG. 3.

The switching circuit 7 includes a switching relay 8, a coil (not illustrated), and a drive circuit (not illustrated). The drive circuit switches on/off of the switching relay 8 in accordance with a control signal from the control unit 17. The control signal is a signal indicating that the switching relay 8 is to be turned on, or indicating that the switching relay 8 is to be turned off. The switching circuit 7 is an example of a first switching circuit described in the appended claims.

Here, off of the switching relay 8 refers to a state in which the switching relay 8 is connected with the power line L1 that is one of branches at a branching point n2, as illustrated in FIGS. 1 and 2. On the other hand, on of the switching relay 8 refers to a state in which the switching relay 8 is connected with the power line L2 as illustrated in FIG. 3. Note that the branching point n2 is a point (position) on the power line L1 (first phase) on the plus side. The plus side means that it is connected to the plus of an external power source, and corresponds to power lines L1 to L3. A minus side means that it is connected to the minus of the external power source, and corresponds to a power line N.

The control unit 17 includes, for example, a processor such as a central processing unit (CPU), a read only memory (ROM), and a random access memory (RAM).

The rush current prevention circuit 12 is provided on an alternating-current power source side of a meeting point (connection point) n3 of a minus side line of the power source circuit 1a and a minus side line of the power source circuit 1b, and restricts a rush current. The meeting point n3 is a point on current line N on the minus side. With such a configuration, because it becomes unnecessary to provide the rush current prevention circuit 12 for each line, downsizing of the switching power source device 100 can be achieved.

Figure 5:
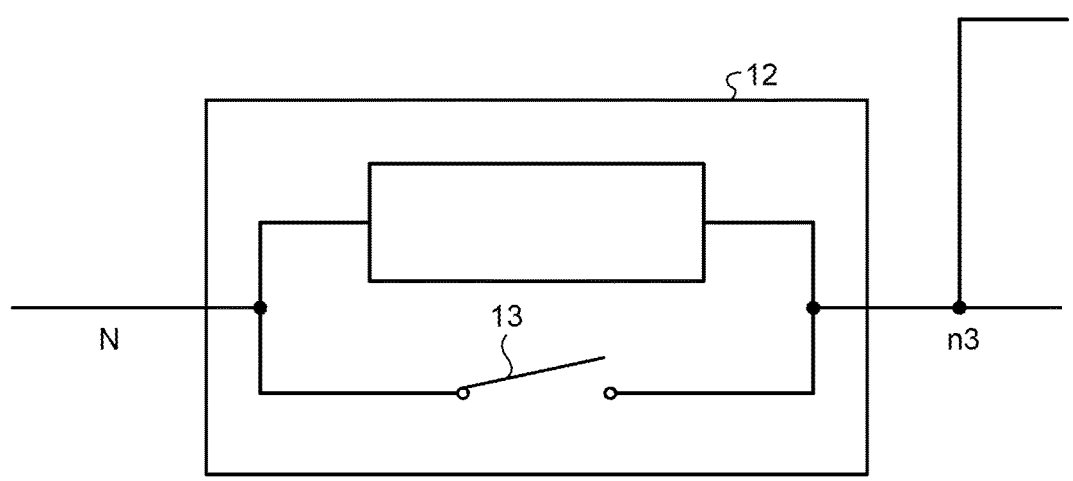
FIG. 5 is a diagram illustrating a configuration example of a rush current prevention circuit of the switching power source device according to the first embodiment.

FIG. 5 is a diagram illustrating a configuration example of the rush current prevention circuit 12. The rush current prevention circuit 12 includes a fuse (not illustrated), a rush current limiting resistor, a rush prevention relay 13 arranged in parallel with the rush current limiting resistor, a coil (not illustrated), and a drive circuit (not illustrated). The drive circuit switches on/off of the rush prevention relay 13 in accordance with a control signal from the control unit 17.

The control signal is a signal indicating that the rush prevention relay 13 is to be turned on, or indicating that the rush prevention relay 13 is to be turned off. As an example, FIG. 5 illustrates a case where the rush prevention relay 13 is turned off.

The control unit 17 generates a control signal by cooperation between the above-described processor such as a CPU, and a program (software) stored in the ROM or the like, for example. Note that a function of the control unit 17 is not limited to that implemented by software, and may be implemented by a hardware configuration such as a dedicated circuit. Furthermore, the control unit 17 may be provided outside the switching power source device 100.

Note that the rush current prevention circuit 12 needs not be provided on the single-phase alternating-current power source 10a side of the meeting point n3, and may be provided at a different position. For example, the rush current prevention circuit 12 may be provided on both of the minus side line of the power source circuit 1a, and the minus side line of the power source circuit 1b.

The control unit 17 controls the switching circuit 7 in accordance with the number of phases of an external power source (alternating-current power source) connected to the switching power source device 100.

Heretofore, an example of a configuration of the switching power source device 100 has been described.

Figure 6:
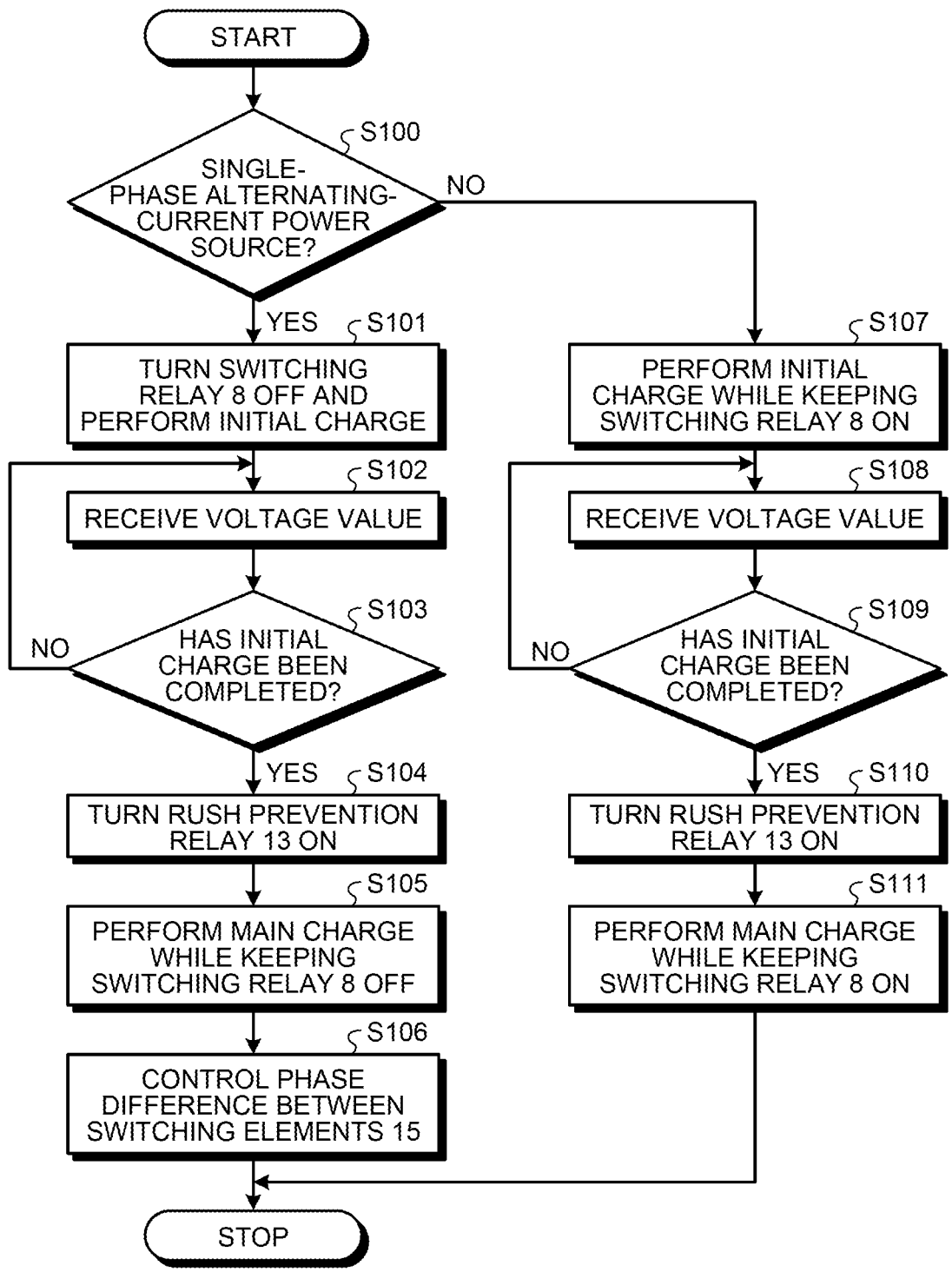
FIG. 6 is a flowchart illustrating an operation example of the switching power source device according to the first embodiment.

Next, an example of an operation of the switching power source device 100 will be described using FIG. 6. FIG. 6 is a flowchart illustrating an operation example of the switching power source device 100. The operation to be described below is started when an alternating-current power source is connected.

First of all, the control unit 17 determines the specification of a connected alternating-current power source. Specifically, the control unit 17 determines whether an alternating-current power source is the single-phase alternating-current power source 10a or the two-phase alternating-current power source 10b (Step S100).

Whether an alternating-current power source is the single-phase alternating-current power source 10a or the two-phase alternating-current power source 10b is determined by the control unit 17 on the basis of voltage output by the voltmeter 6 that measures a voltage of the capacitor 5, for example.

When the flowchart is started, the switching relay 8 is in the on state. Therefore, in a case where the switching power source device 100 is connected to the single-phase alternating-current power source 10a (in a case where the plus side of the single-phase alternating-current power source 10a is connected to the power line L1, for example), a positive voltage value is output to the control unit 17 from the voltmeter 6 that measures a voltage of the capacitor 5 included in the power source circuit 1a.

Furthermore, because a single-phase alternating-current power source is not connected to the power source circuit 1b (the plus side of the single-phase alternating-current power source 10a is not connected to the power line L2), a voltage value of 0 is output to the control unit 17 from the voltmeter 6 that measures a voltage of the capacitor 5 included in the power source circuit 1b.

In contrast to this, in a case where the switching power source device 100 is connected to the two-phase alternating-current power source 10b (in a case where plus sides of the respective phases of the two-phase alternating-current power source 10b are connected to the power line L1 and the power line L2), a positive voltage value is output to the control unit 17 also from the voltmeter 6 that measures a voltage of the capacitor 5 included in the power source circuit 1b.

Accordingly, on the basis of voltage values respectively output from the voltmeters 6, the control unit 17 can detect whether the switching power source device 100 is connected to the single-phase alternating-current power source 10a or connected to the two-phase alternating-current power source 10b.

For example, in a case where a voltage value equal to or smaller than a preset threshold value is output from one voltmeter 6 of the voltmeters 6 respectively included in the power source circuit 1a and the power source circuit 1b, the control unit 17 determines that the switching power source device 100 is connected to the single-phase alternating-current power source 10*a*. Furthermore, for example, in a case where voltage values exceeding the preset threshold value are output from all the voltmeters 6 respectively included in the power source circuit 1*a* and the power source circuit 1*b*, the control unit 17 determines that the switching power source device 100 is connected to the two-phase alternating-current power source 10*b*.

Note that, as described above, the control unit 17 may determine whether the switching power source device 100 is connected to the single-phase alternating-current power source 10*a* or connected to the two-phase alternating-current power source 10*b*, using a voltmeter other than the voltmeter 6 or an ammeter.

Next, the control unit 17 performs initial charge of the capacitor 5 in accordance with the determined specification of the alternating-current power source. Here, in a case where the switching power source device 100 is connected to the single-phase alternating-current power source 10*a* as illustrated in FIG. 1 (in a case of Yes in Step S100), the control unit 17 switches the switching relay 8 off and performs initial charge (Step S101).

Note that, when the flowchart is started, in addition to the switching relay 8 being turned on, the rush prevention relay 13 of the rush current prevention circuit 12 is turned off as illustrated in FIG. 5.

Here, the reason why the switching relay 8 is turned on at the time of start is because a short circuit is made in a case where the switching power source device 100 is connected to the two-phase alternating-current power source 10*b*. Furthermore, the reason why the rush prevention relay 13 is turned off at the time of start is because a rush current flows in the capacitor 5 because a voltage difference between an alternating-current power source and the capacitor 5 is large because the capacitor 5 is discharged when the alternating-current power source is connected.

Because the rush prevention relay 13 is turned off, power supplied from the single-phase alternating-current power source 10*a* is supplied to the power source circuit 1*a* via the power line L1, and also supplied to a rush current restriction resistor of the rush current prevention circuit 12.

With this configuration, it is possible to perform charge (initial charge) of the capacitor 5 of the power source circuit 1*a* while preventing a rush current from flowing in the power source circuit 1*a*.

After the above-described control, the control unit 17 receives a voltage value of the capacitor 5 that has been measured by the voltmeter 6 (Step S102). A timing at which the control unit 17 receives a voltage value from the voltmeter 6 is after the lapse of a predetermined time after the control unit 17 switches the switching relay 8 off (Step S101). After the control unit 17 receives a voltage value, the processing proceeds to Step S103.

Next, the control unit 17 determines whether or not initial charge of the capacitor 5 has been completed, by comparing the voltage value received from the voltmeter 6, and the preset threshold value (Step S103). Here, in a case where the voltage value received from the voltmeter 6 is equal to or smaller than the threshold value (in a case of No in Step S103), the processing returns to Step S102.

On the other hand, in a case where the voltage value received from the voltmeter 6 is larger than the threshold value (in a case of Yes in Step S103), the control unit 17 determines that initial charge of the capacitor 5 has been completed. At this time, the control unit 17 switches the rush prevention relay 13 on (Step S104).

Then, the control unit 17 performs charge (main charge) of the battery 20 while maintaining the switching relay 8 in the off state (Step S105). In other words, in a case where the switching power source device 100 is connected to the single-phase alternating-current power source 10*a*, the control unit 17 connects a different power source circuit (the power source circuit 1*b*) other than a specific power source circuit (the power source circuit 1*a*) to a specific phase (for example, power line L1) corresponding to the single-phase alternating-current power source 10*a*, by controlling the switching circuit 7.

By performing charge of the battery 20 while putting the switching relay 8 in the off state, the battery 20 is charged while not only the filter circuit 2 included in the power source circuit 1*a* but also the filter circuit 2 included in the power source circuit 1*b* remain connected to the single-phase alternating-current power source 10*a*. Therefore, as compared with a case where charge is performed using only the filter circuit 2 included in the power source circuit 1*a*, noise reduction performance can be enhanced.

For example, an X capacitor or a Y capacitor is used in the filter circuit 2. The X capacitor is a capacitor that mainly removes normal mode (differential mode) noise in the switching power source device 100, and the Y capacitor is a capacitor that mainly removes common mode noise in the switching power source device 100. The Y capacitor is connected to a vehicle body (frame ground).

Note that a noise filter such as a core or a coil may be used in the filter circuit 2 aside from the capacitor.

After Step S105, the processing proceeds to Step S106. In Step S106, the power factor improvement control unit 18 that controls an operation of the switching element 15 controls a phase difference between the switching element 15 provided in the power source circuit 1*a*, and the switching element 15 provided in the power source circuit 1*b*.

Specifically, the power factor improvement control unit 18 controls a phase difference between the switching element 15 provided in the power source circuit 1*a* and the switching element 15 provided in the power source circuit 1*b*, to be 180 degrees (Step S106). By the power factor improvement control unit 18 controlling the switching element 15 provided in the power source circuit 1*a* and the switching element 15 provided in the power source circuit 1*b* by providing a phase difference in this manner, an output wave generated by on/off of the switching element 15 provided in the power source circuit 1*a*, and an output wave generated by on/off of the switching element 15 provided in the power source circuit 1*b* can be overlapped, and a ripple current generated by the switching between on/off of the switching element 15 can be consequently reduced. Furthermore, an effective frequency can also be increased.

By the power factor improvement control unit 18 controlling a phase difference between the switching element 15 provided in the power source circuit 1*a* and the switching element 15 provided in the power source circuit 1*b*, to be 180 degrees, when the switching circuit 7 is in the first mode, a ripple current generated by the switching between on/off of the switching element 15 can be minimized. Note that a phase difference between the switching element 15 provided in the power source circuit 1*a* and the switching element 15 provided in the power source circuit 1*b* is not limited to 180 degrees, and is only required to be 150 degrees or more, for example.

That is to say, by connecting a different power source circuit (the power source circuit 1*b*) other than a specific power source circuit (the power source circuit 1*a*) to a specific phase (for example, power line L1) corresponding to the single-phase alternating-current power source 10a, an effect similar to that in a case where an operation is performed by the interleave method can be obtained. This is because one set of the coil 14, the switching element 15, and the diode 16 provided in the specific power source circuit (the power source circuit 1a), and one set of the coil 14, the switching element 15, and the diode 16 provided in the different power source circuit (the power source circuit 1b) can be used.

More specifically, each of the power source circuits 1a and 1b includes the power factor improvement circuit 4 employing the single method including one coil 14, one switching element 15, and one diode 16, but it becomes possible to reduce a ripple current similarly to a conventional power source circuit employing the interleave method. As compared with a power source circuit employing the interleave method including two coils, two switching elements, and two diodes, the number of components can be reduced, and this leads to the downsizing of a device and cost reduction.

Furthermore, because the switching power source device 100 originally includes the coil 14, the switching element 15, and the diode 16 that are included in the power source circuit 1b connecting to the single-phase alternating-current power source 10a, there is no need to newly provide the coil 14, the switching element 15, and the diode 16, and an advantageous effect is caused from the aspect of prevention of cost increase and upsizing of a device.

Note that the order of Steps S105 and S106 may be made reverse, or Steps S105 and S106 may be concurrently operated.

The power factor improvement control unit 18 is incorporated into a power factor improvement circuit as an IC chip in such a manner as to control on/off of the switching element 15. The control unit 18 controls on/off of the switching element 15 by transmitting a control signal to the switching element 15. The power factor improvement control unit 18 generates a control signal by cooperation between a processor such as a CPU, and a program (software) stored in a ROM or the like, for example.

Note that a function of the power factor improvement control unit 18 is not always implemented by software, and may be implemented by a hardware configuration such as a dedicated circuit. Furthermore, the power factor improvement control unit 18 may be provided on the outside of the power factor improvement circuit 4, or may be provided on the outside of the switching power source device 100.

Furthermore, a part or all of functions of controlling the switching element 15 that are included in the power factor improvement control unit 18 may be included in the control unit 17. The control unit 17 including all of functions of controlling the switching element 15 that are included in the power factor improvement control unit 18 means that the power factor improvement control unit 18 and the control unit 17 are commoditized.

On the other hand, in a case where the switching power source device 100 is connected to the two-phase alternating-current power source 10b (in a case of No in Step S100), the control unit 17 performs initial charge while maintaining the switching relay 8 in the on state as illustrated in FIG. 3 (Step S107).

Furthermore, also in a case where the switching power source device 100 is connected to the two-phase alternating-current power source 10b, the rush prevention relay 13 is turned off. Therefore, power supplied from the two-phase alternating-current power source 10b is supplied to the power source circuit 1a and the power source circuit 1b via the power line L1 and the power line L2, and also supplied to the rush current restriction resistor.

In other words, a configuration in which the power source circuit 1a, the power source circuit 1b, and the rush current restriction resistor are connected between a neutral point n1 of the two-phase alternating-current power source 10b and the first phase (power line L1) is employed (refer to FIG. 3).

Accordingly, it is possible to perform charge (initial charge) of the capacitors 5 of the power source circuit 1a and the power source circuit 1b while preventing a rush current from flowing in the power source circuit 1a and the power source circuit 1b, by the rush current restriction resistor.

After the above-described control, the control unit 17 receives a voltage value of the capacitor 5 that has been measured by the voltmeter 6 (Step S108).

Next, the control unit 17 determines whether or not initial charge of the capacitor 4 has been completed, by comparing the voltage value received from the voltmeter 6, and the preset threshold value (Step S109). Here, in a case where the voltage value received from the voltmeter 6 is equal to or smaller than the threshold value (in a case of No in Step S109), the processing returns to Step S108.

On the other hand, in a case where voltage values received from the voltmeters 6 respectively provided in the power source circuit 1a and the power source circuit 1b are both larger than the threshold value (in a case of Yes in Step S109), the control unit 17 determines that initial charge of the capacitors 5 respectively provided in the power source circuit 1a and the power source circuit 1b has been completed. At this time, the control unit 17 switches the rush prevention relay 13 on (Step S110).

Then, the control unit 17 performs charge (main charge) of the battery 20 while maintaining the switching relay 8 in the on state (Step S111).

Heretofore, an example of an operation of the switching power source device 100 has been described.

In the present embodiment, in the switching power source device 100 adapted to the single-phase alternating-current power source 10a and the two-phase alternating-current power source 10b, the control unit 17 connects, to each phase of an alternating-current power source, a different power source circuit corresponding to the phase, and in a case where the number of phases of the alternating-current power source is smaller than the number of power source circuits, connects a different power source circuit corresponding to an excess, to the specific phase. Note that the control unit 17 is not an essential configuration of a switching power source device in the present disclosure. For example, the control unit 17 may exist on the outside of a switching power source.

That is to say, in a case where an alternating-current power source (the two-phase alternating-current power source 10b) having the same number of phases as the number of power source circuits is connected, the control unit 17 controls the switching circuit 7 to connect a different power source circuit (the power source circuit 1b) other than a specific power source circuit (the power source circuit 1a) corresponding to a specific phase (power line L1), to a phase (power line L2) corresponding to the different power source circuit (the power source circuit 1b), and in a case where an alternating-current power source (the single-phase alternating-current power source 10a) having the number of phases smaller than the number of power source circuits is connected, the control unit 17 controls the switching circuit 7 to connect the different power source circuit (the power source circuit 1b) corresponding to an excess, to the specific phase (power line L1).

With this configuration, in a case where the single-phase alternating-current power source 10a is connected, it becomes possible for the switching power source device 100 to improve a power factor of power input from the rectifying circuit 3, using not only the coil 14, the switching element 15, and the diode 16 included in the power source circuit 1a, but also the coil 14, the switching element 15, and the diode 16 included in the power source circuit 1b, and the like.

Moreover, by the power factor improvement control unit 18 controlling a phase difference between the switching element 15 provided in the power source circuit 1a and the switching element 15 provided in the power source circuit 1b, to be 180 degrees, it is possible to reduce a ripple current, and obtain an effect similar to that of the interleave method although the configuration of the single method is employed.

Second Embodiment

Next, an example of a configuration of a switching power source device 200 of the present embodiment will be described.

Configuration of Switching Power Source Device 200

Figure 7:
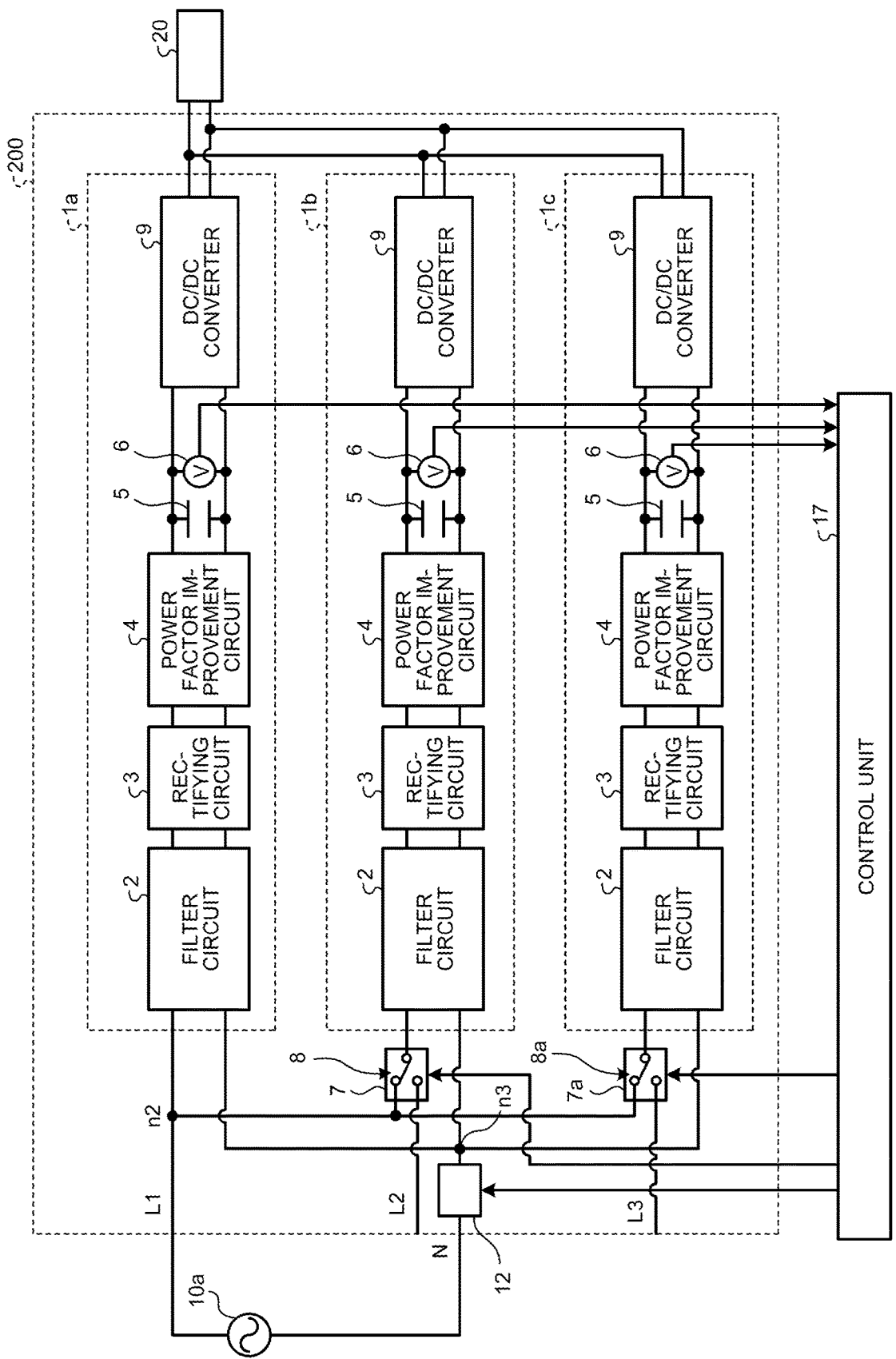
FIG. 7 is a circuit diagram illustrating a case where a switching power source device according to a second embodiment is connected with a single-phase alternating-current power source.

FIG. 7 is a circuit diagram illustrating a configuration example of the switching power source device 200. The switching power source device 200 has a configuration including three power source circuits (power source circuits 1a to 1c) for adopting to a three-phase alternating-current power source. Note that, in FIG. 7, the same configurations as those in FIG. 1 are assigned the same reference numerals, and the description of these will be omitted.

The switching power source device 200 is used in a charging device of a vehicle such as an electric automobile or a hybrid automobile, for example.

The switching power source device 200 is different from the switching power source device 100 illustrated in FIG. 1 in that a power source circuit 1c and a switching circuit 7a are added. The power source circuit 1c has the same configuration as those of the power source circuits 1a and 1b. Furthermore, the switching circuit 7a has the same configuration as the switching circuit 7, and on/off of a switching relay 8a is controlled by the control unit 17. Note that the switching circuit 7a is an example of a second switching circuit described in the appended claims.

In a state in which the switching relay 8a of the switching circuit 7a is turned off, the switching relay 8a is connected with one power line L1 branched at a branching point n2 as illustrated in FIG. 7. On the other hand, in a state in which the switching relay 8a of the switching circuit 7a is turned on, the switching relay 8a is connected with a power line L3.

Figure 8:
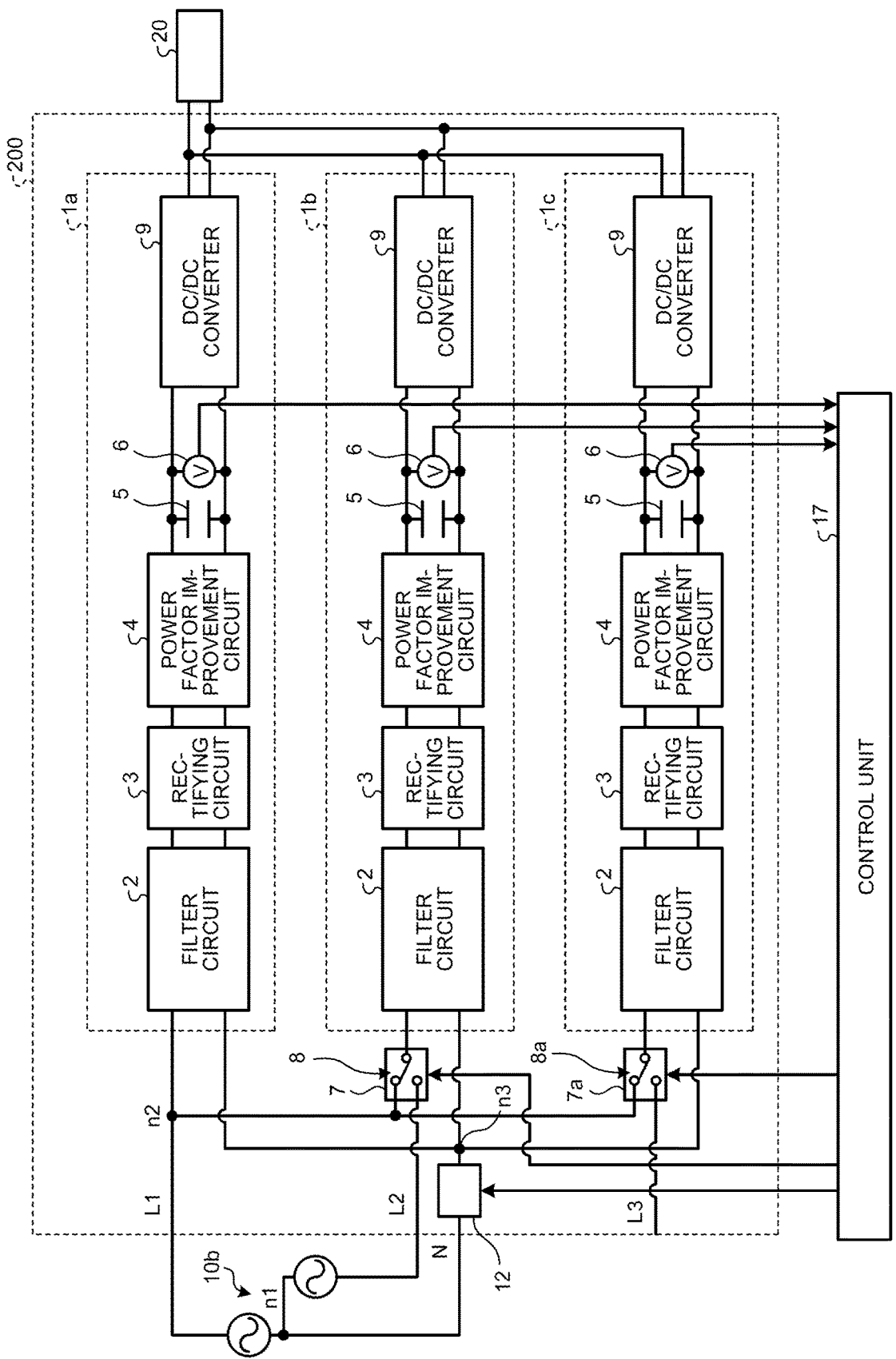
FIG. 8 is a circuit diagram illustrating a case where the switching power source device according to the second embodiment is connected with a two-phase alternating-current power source.
Figure 9:
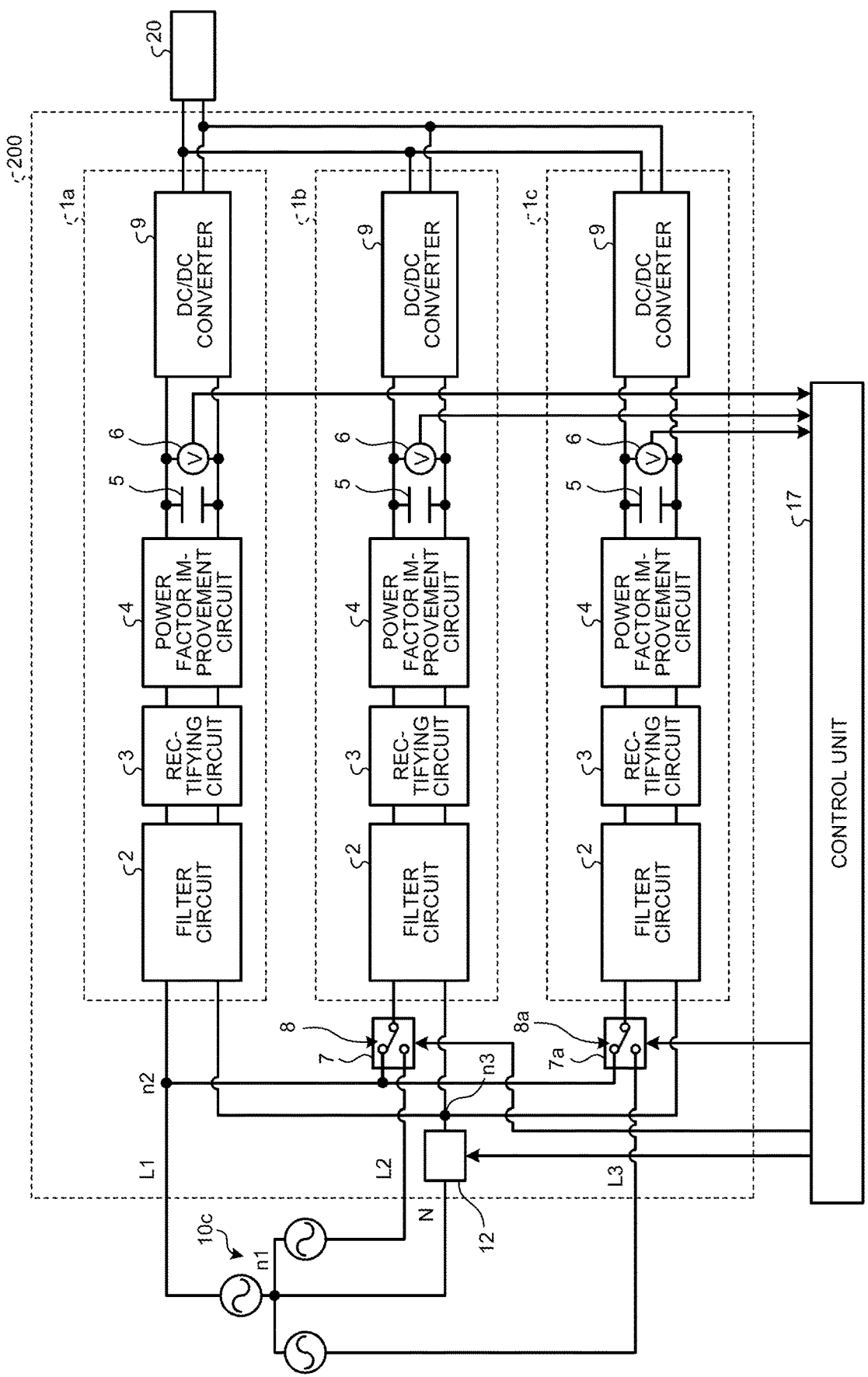
FIG. 9 is a circuit diagram illustrating a case where the switching power source device according to the second embodiment is connected with a three-phase alternating-current power source.

Furthermore, as an example, FIG. 7 illustrates a case where the switching power source device 200 is connected to the single-phase alternating-current power source 10a, but the switching power source device 200 may be connected to the two-phase alternating-current power source 10b as illustrated in FIG. 8, or may be connected to the three-phase alternating-current power source 10c as illustrated in FIG. 9. The switching power source device 200 of the present embodiment has a configuration adaptable to the single-phase alternating-current power source 10a, the two-phase alternating-current power source 10b, and the three-phase alternating-current power source 10c.

The rush current prevention circuit 12 is provided on an alternating-current power source side of a meeting point (connection point) n3 of a minus side line of the power source circuit 1a, a minus side line of the power source circuit 1b, and a minus side line of the power source circuit 1c, and restricts a rush current.

Note that, in FIG. 7, the respective minus side lines of the power source circuits 1a to 1c are connected at one meeting point (connection point) n3, but for example, a first connection point at which the minus side line of the power source circuit 1a and the minus side line of the power source circuit 1b are connected, and a second connection point at which the minus side line of the power source circuit 1b and the minus side line of the power source circuit 1c are connected may be different.

In this case, for example, the rush current prevention circuit 12 is provided on an alternating-current power source side of the first connection point and the second connection point, for example. With such a configuration, it becomes unnecessary to provide the rush current prevention circuit 12 for each line, and the downsizing of the switching power source device 200 can be achieved.

Note that the rush current prevention circuit 12 needs not be provided on an alternating-current power source side of the first connection point and the second connection point, and may be provided at a different position. For example, the rush current prevention circuit 12 may be provided on both of the minus side line of the power source circuit 1a, a minus side line of the power source circuit 1b, and the minus side line of the power source circuit 1c.

In the present embodiment, similarly to the first embodiment, the switching circuit 7 is switched by the control unit 17 between the first mode and the second mode, which have been described in the first embodiment. Furthermore, the switching circuit 7a is switched by the control unit 17 whether to connect the power source circuit 1c (third power source circuit) to the first phase (power line L1) in parallel with the power source circuit 1a (first power source circuit) and the power source circuit 1b (second power source circuit), or whether to connect the power source circuit 1c (third power source circuit) to a third phase (power line L3).

A mode in which the control unit 17 controls the switching circuit 7a to connect the power source circuit 1c (third power source circuit) to the first phase (power line L1) in parallel with the power source circuit 1a (first power source circuit) and the power source circuit 1b (second power source circuit) will be referred to as a third mode. Furthermore, a mode in which the control unit 17 controls the switching circuit 7a to connect the power source circuit 1c (third power source circuit) to the third phase (power line L3) will be referred to as a fourth mode.

Figure 10:
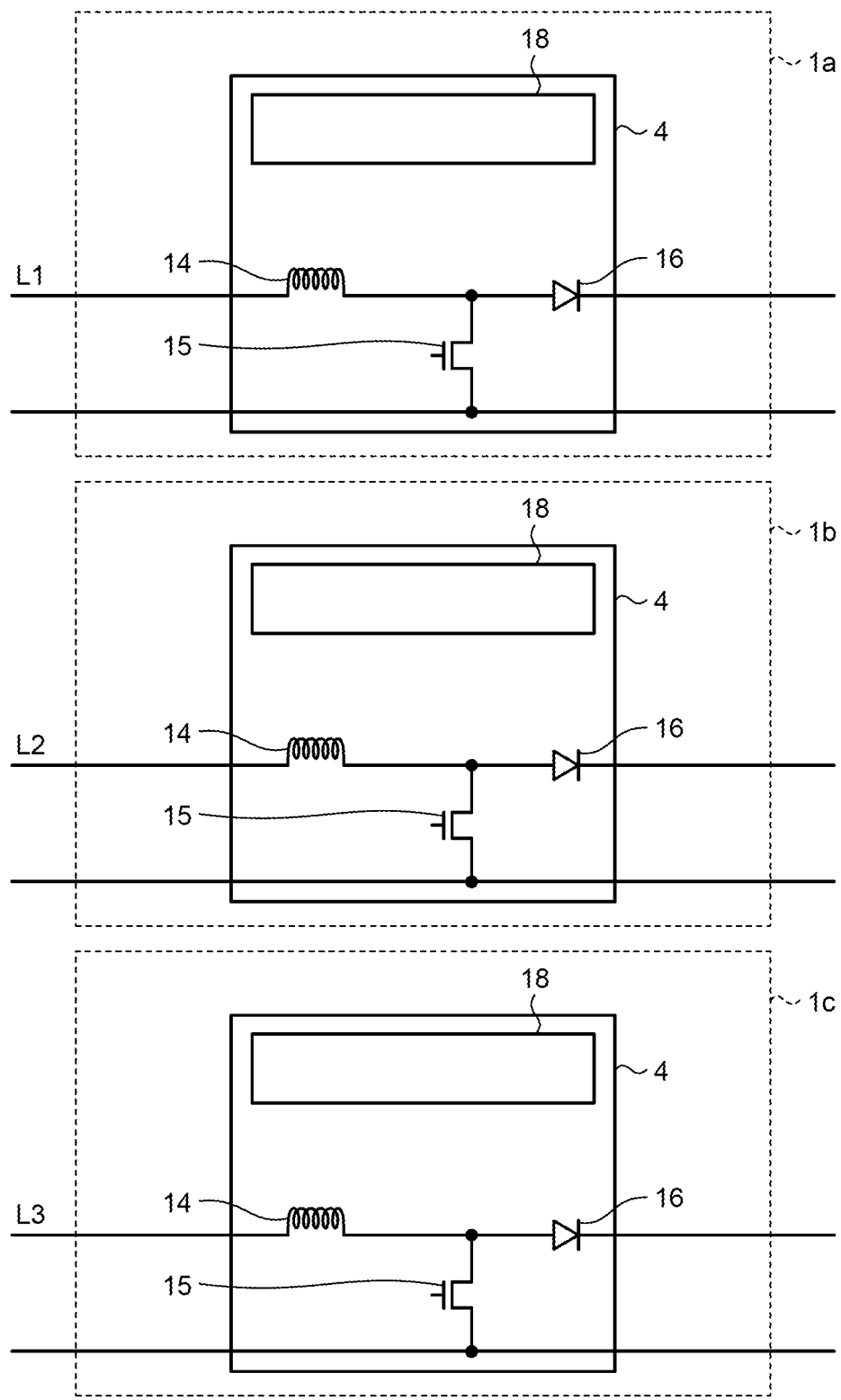
FIG. 10 is a diagram illustrating a configuration example of a power factor improvement circuit of the switching power source device according to the second embodiment.

Furthermore, as illustrated in FIG. 10, the power source circuits 1a, 1b, and 1c each include the power factor improvement circuit 4 including the coil 14, the switching element 15, and the diode 16. Furthermore, the power factor improvement circuit 4 includes the power factor improvement control unit 18. As compared with FIG. 4, a difference lies only in that the power source circuit 1c including the power factor improvement circuit 4 is provided. Thus, the description of FIG. 10 will be omitted.

Heretofore, an example of a configuration of the switching power source device 200 has been described.

Operation of Switching Power Source Device 200

Figure 11:
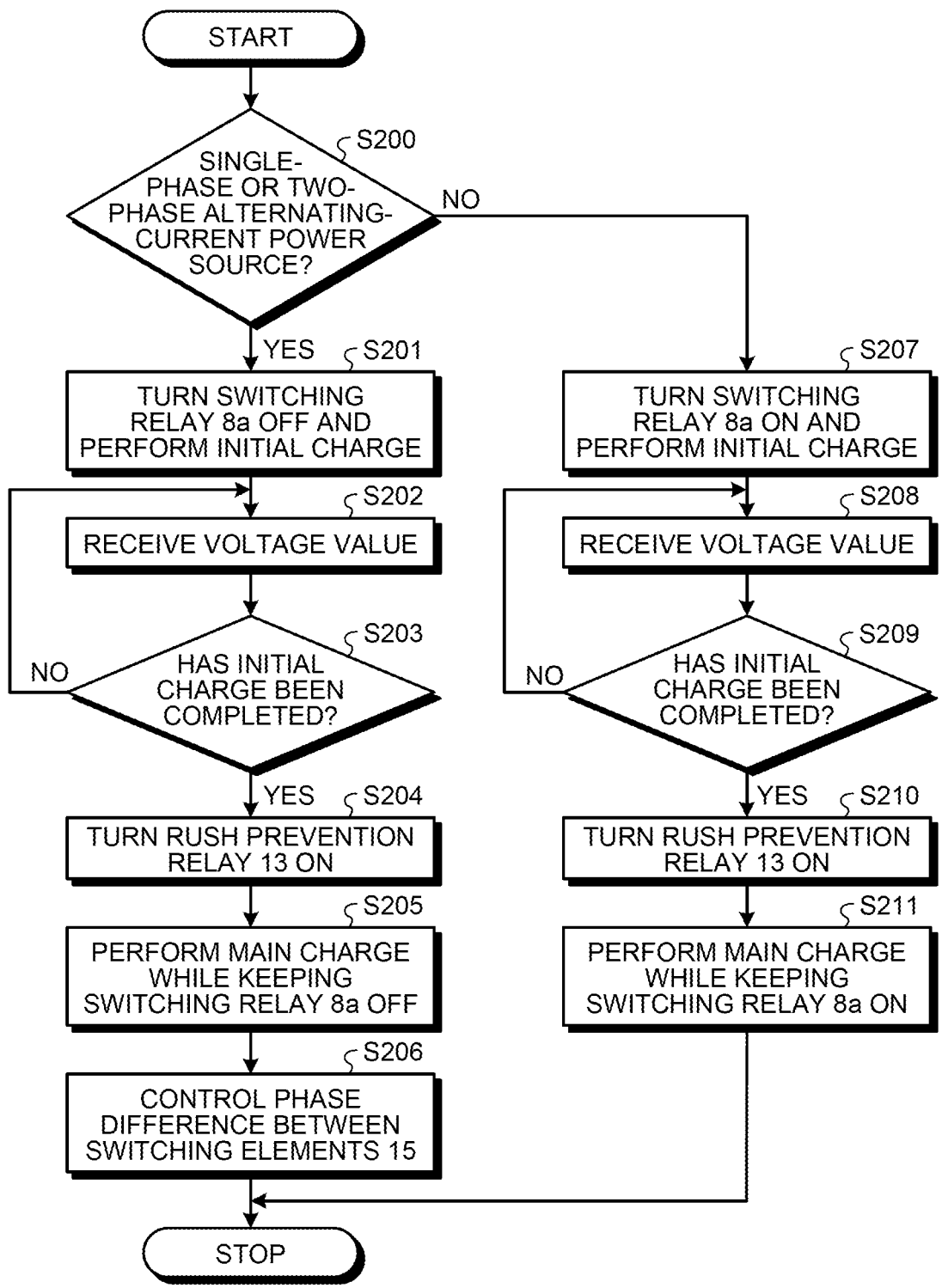
FIG. 11 is a flowchart illustrating an operation example of the switching power source device according to the second embodiment.

Next, an example of an operation of the switching power source device 200 will be described using FIG. 11. FIG. 11 is a flowchart illustrating an operation example of the switching power source device 200. The operation to be described below is started when an alternating-current power source is connected.

First, the control unit 17 determines the specification of a connected alternating-current power source (step S200). Specifically, the control unit 17 determines which of the single-phase alternating-current power source 10a, the two-phase alternating-current power source 10b, or the three-phase alternating-current power source 10c, an alternating-current power source is.

Whether an alternating-current power source is the single-phase alternating-current power source 10a, the two-phase alternating-current power source 10b, or the three-phase alternating-current power source 10c is determined by the control unit 17 on the basis of the voltage value output by the voltmeter 6 that measures a voltage of the capacitor 5, for example.

When the flowchart is started, the switching relays 8 and 8a are in the on state. Therefore, in a case where the switching power source device 200 is connected to the single-phase alternating-current power source 10a (in a case where the plus side of the single-phase alternating-current power source 10a is connected to the power line L1, for example), a positive voltage value is output to the control unit 17 from the voltmeter 6 that measures a voltage of the capacitor 5 included in the power source circuit 1a.

Furthermore, in this case, because a single-phase alternating-current power source is not connected to the power source circuits 1b and 1c (the plus side of the single-phase alternating-current power source 10a is not connected to the power line L2 and the power line L3), a voltage value of 0 is output to the control unit 17 from the voltmeter 6 that measures a voltage of the capacitor 5 included in the power source circuits 1b and 1c.

In a case where the switching power source device 200 is connected to the two-phase alternating-current power source 10b (in a case where plus sides of the respective phases of the two-phase alternating-current power source 10b are connected to the power line L1 and the power line L2), a positive voltage value is output to the control unit 17 from the voltmeter 6 that measures a voltage of the capacitor 5 included in the power source circuits 1a and 1b.

Furthermore, in this case, a voltage value of 0 is output to the control unit 17 from the voltmeter 6 that measures a voltage of the capacitor 5 included in the power source circuit 1c.

In a case where the switching power source device 200 is connected to the three-phase alternating-current power source 10c (in a case where plus sides of the respective phases of the three-phase alternating-current power source 10c are connected to the power line L1, the power line L2, and the power line L3), a positive voltage value is output to the control unit 17 from the voltmeter 6 that measures a voltage of the capacitor 5 included in the power source circuits 1a, 1b, and 1c.

Accordingly, on the basis of voltage values respectively output from the voltmeters 5, the control unit 17 can detect to which of the single-phase alternating-current power source 10a, the two-phase alternating-current power source 10b, or the three-phase alternating-current power source 10c the switching power source device 200 is connected.

For example, in a case where a voltage value equal to or smaller than a preset threshold value is output from one or two voltmeter(s) 6 of the voltmeters 6 respectively included in the power source circuits 1a to 1c, the control unit 17 determines that the switching power source device 200 is connected to the single-phase alternating-current power source 10a or the two-phase alternating-current power source 10b. Furthermore, for example, in a case where voltage values exceeding the preset threshold value are output from all the voltmeters 6 respectively included in the power source circuits 1a to 1c, the control unit 17 determines that the switching power source device 100 is connected to the three-phase alternating-current power source 10c.

Note that the control unit 17 may determine which of the single-phase alternating-current power source 10a, the two-phase alternating-current power source 10b, and the three-phase alternating-current power source 10c the switching power source device 200 is connected to, using a separately provided voltmeter other than the voltmeter 6, or an ammeter.

Next, the control unit 17 performs initial charge of the capacitor 5 in accordance with the determined specification of the alternating-current power source.

In a case where the switching power source device 200 is connected to the single-phase alternating-current power source 10a or the two-phase alternating-current power source 10b (in a case of Yes in Step S200), the control unit 17 switches the switching relay 8 (or the switching relays 8 and 8a) off and performs initial charge (Step S201).

Note that, in Step S201, initial charge may be performed after switching the switching relay 8a off in place of the switching relay 8, or initial charge may be performed after switching both of the switching relay 8 and the switching relay 8a off.

Note that, when the flowchart is started, in addition to the switching relay 8 or 8a being turned on, the rush prevention relay 13 is assumed to be turned off. Because the reason why the switching relay 8 or 8a is turned on at the time of start is the same as the reason why the switching relay 8 is turned on at the time of start in the first embodiment, the description will be omitted. Furthermore, the reason why the rush prevention relay 13 is turned off at the time of start is also similar to that in the first embodiment. Furthermore, Steps S202 to S204 are similar to Steps S102 to S104.

Then, the control unit 17 performs charge (main charge) of the battery 20 while maintaining the switching relay 8a in the off state (Step S205). In other words, in a case where the single-phase alternating-current power source 10a or the two-phase alternating-current power source 10b is connected to the switching power source device 200, that is to say, in a case where the number of phases of a connected alternating-current power source is smaller than the number of power source circuits, by controlling the switching circuit 7a, the control unit 17 connects a power source circuit corresponding to an excess (for example, either one or both of the power source circuits 1b and 1c) to the specific phase (for example, power line L1).

Thus, by performing charge of the battery 20 while putting the switching relay 8a in the off state, the battery 20 is charged while not only the filter circuit 2 included in the power source circuit 1a but also the filter circuit 2 included in the power source circuit 1c are in the state of being connected to the single-phase alternating-current power source 10a. Therefore, as compared with a case where charge is performed using only the filter circuit 2 included in the power source circuit 1a, noise reduction performance can be enhanced.

After Step S205, the processing proceeds to Step S206. In Step S206, the power factor improvement control unit 18 that controls an operation of the switching element 15 controls a phase difference between the switching element 15 provided in the power source circuit 1a, the switching element 15 provided in the power source circuit 1b, and the switching element 15 provided in the power source circuit 1c.

Specifically, the power factor improvement control unit 18 controls a phase difference between the switching element 15 provided in the power source circuit 1a, the switching element 15 provided in the power source circuit 1b, and the switching element 15 provided in the power source circuit 1c, to be 120 degrees (Step S206).

By the power factor improvement control unit 18 controlling the switching element 15 provided in the power source circuit 1a, the switching element 15 provided in the power source circuit 1b, and the switching element 15 provided in the power source circuit 1c by providing a phase difference in this manner, an output wave generated by on/off of the switching element 15 provided in the power source circuit 1a, an output wave generated by on/off of the switching element 15 provided in the power source circuit 1b, and an output wave generated by on/off of the switching element 15 provided in the power source circuit 1c can be overlapped, and a ripple current generated by the switching between on/off of the switching element 15 can be consequently reduced. Furthermore, an effective frequency can also be increased.

By the power factor improvement control unit 18 controlling a phase difference between the switching element 15 provided in the power source circuit 1a, the switching element 15 provided in the power source circuit 1b, and the switching element 15 provided in the power source circuit 1c, to be 120 degrees, in a case where the switching circuit 7 is in the first mode and the switching circuit 7a is in the third mode, a ripple current generated by the switching between on/off of the switching element 15 can be minimized. Note that a phase difference between the switching element 15 provided in the power source circuit 1a, the switching element 15 provided in the power source circuit 1b, and the switching element 15 provided in the power source circuit 1c is not limited to 120 degrees, and is only required to be 90 degrees or more and 150 degrees or less, for example.

That is to say, by connecting different power source circuits (for example, the power source circuit 1b and the power source circuit 1c) other than a specific power source circuit (the power source circuit 1a) to a specific phase (for example, power line L1) corresponding to the single-phase alternating-current power source 10a or the two-phase alternating-current power source 10b, an effect similar to that in a case where an operation is performed by the interleave method can be obtained by using one set of the coil 14, the switching element 15, and the diode 16 provided in the specific power source circuit (the power source circuit 1a), and the coils 14, the switching elements 15, and the diodes 16 provided in the different power source circuits (the power source circuit 1b and the power source circuit 1c).

In other words, the switching element 15 of the specific power source circuit (the power source circuit 1a) connected to the specific phase (for example, power line L1), and one switching element 15 and the other switching element 15 respectively included in two different power source circuits (the power source circuit 1b and the power source circuit 1c) connected to the specific phase (power line L1) are driven with a phase difference of 120 degrees.

More specifically, each of the power source circuits 1a, 1b, and 1c includes the power factor improvement circuit 4 employing the single method including one coil 14, one switching element 15, and one diode 16, but it becomes possible to further reduce a ripple current more than a conventional power factor improvement circuit employing the interleave method including two coils 14, two switching elements 15, and two diodes 16. As compared with the interleave method including two coils, two switching elements, and two diodes, the number of components can be reduced, and this leads to the downsizing of a device and cost reduction.

Furthermore, because the switching power source device 100 originally includes the coil 14, the switching element 15, and the diode 16 that are included in the power source circuit 1b and the power source circuit 1c connecting to the single-phase alternating-current power source 10a, there is no need to newly provide the coil 14, the switching element 15, and the diode 16, and an advantageous effect is caused from the aspect of prevention of cost increase and upsizing of a device.

Note that the order of Steps S205 and S206 may be made reverse, or Steps S205 and S206 may be concurrently operated.

On the other hand, in a case where the switching power source device 200 is connected to the three-phase alternating-current power source 10c (in a case of No in Step S200), the control unit 17 performs initial charge while maintaining the switching relay 8a in the on state (Step S207).

Further, even in a case where the switching power source device 200 is connected to the three-phase alternating-current power source 10c, because the rush prevention relay 13 is turned off, power supplied from the three-phase alternating-current power source 10c is supplied to the power source circuits 1a to 1c via the power lines L1 to L3, and also supplied to a rush current restriction resistor.

With this configuration, it is possible to perform charge (initial charge) of the capacitor 5 of the power source circuits 1a to 1c while preventing a rush current from flowing in the power source circuits 1a to 1c.

Steps S208 to S210 are similar to Steps S107 to S210 described above. Then, if the control unit 17 switches the rush prevention relay 13 off in Step S210, the control unit 17 charges the battery 20 while maintaining the switching relay 8 and the switching relay 8a in the on state (Step S211).

Heretofore, an example of an operation of the switching power source device 200 has been described.

In the present embodiment, in the switching power source device 200 adapted to the single-phase alternating-current power source 10a, the two-phase alternating-current power source 10b, and the three-phase alternating-current power source 10c, the control unit 17 connects, to each phase of an alternating-current power source, a different power source circuit corresponding to the phase, and in a case where the number of phases of the alternating-current power source is smaller than the number of power source circuits, connects a different power source circuit corresponding to an excess, to the specific phase.

That is to say, in a case where an alternating-current power source (the two-phase alternating-current power source 10b) having the same number of phases as the number of power source circuits is connected, the control unit 17 controls the switching circuit 7 to connect a different power source circuit (the power source circuit 1b) other than a specific power source circuit (the power source circuit 1a) corresponding to a specific phase (power line L1), to a phase (power line L2) corresponding to the different power source circuit (the power source circuit 1b), and in a case where an alternating-current power source (the single-phase alternating-current power source 10a) having the number of phases smaller than the number of power source circuits is connected, the control unit 17 controls the switching circuit 7 to connect the different power source circuit (the power source circuit 1b and the power source circuit 1c) corresponding to an excess, to the specific phase (power line L1).

With this configuration, in a case where the single-phase alternating-current power source 10a or the two-phase alternating-current power source 10b is connected, it becomes possible for the switching power source device 200 to improve a power factor of power input from the rectifying circuit 3, using not only the coil 14, the switching element 15, and the diode 16 included in the power source circuit 1a, but also the coil 14, the switching element 15, and the diode 16 included in the power source circuit 1b and the power source circuit 1c, and the like.

Moreover, by the power factor improvement control unit 18 controlling a phase difference between the switching element 15 provided in the power source circuit 1a, the switching element 15 provided in the power source circuit 1b, and the switching element 15 provided in the power source circuit 1c, to be 120 degrees, it is possible to further reduce a ripple current, and obtain an effect more than that of the interleave method although the configuration of the single method is employed.

MODIFIED EXAMPLE 1 OF OPERATION OF SWITCHING POWER SOURCE DEVICE 200

Figure 12:
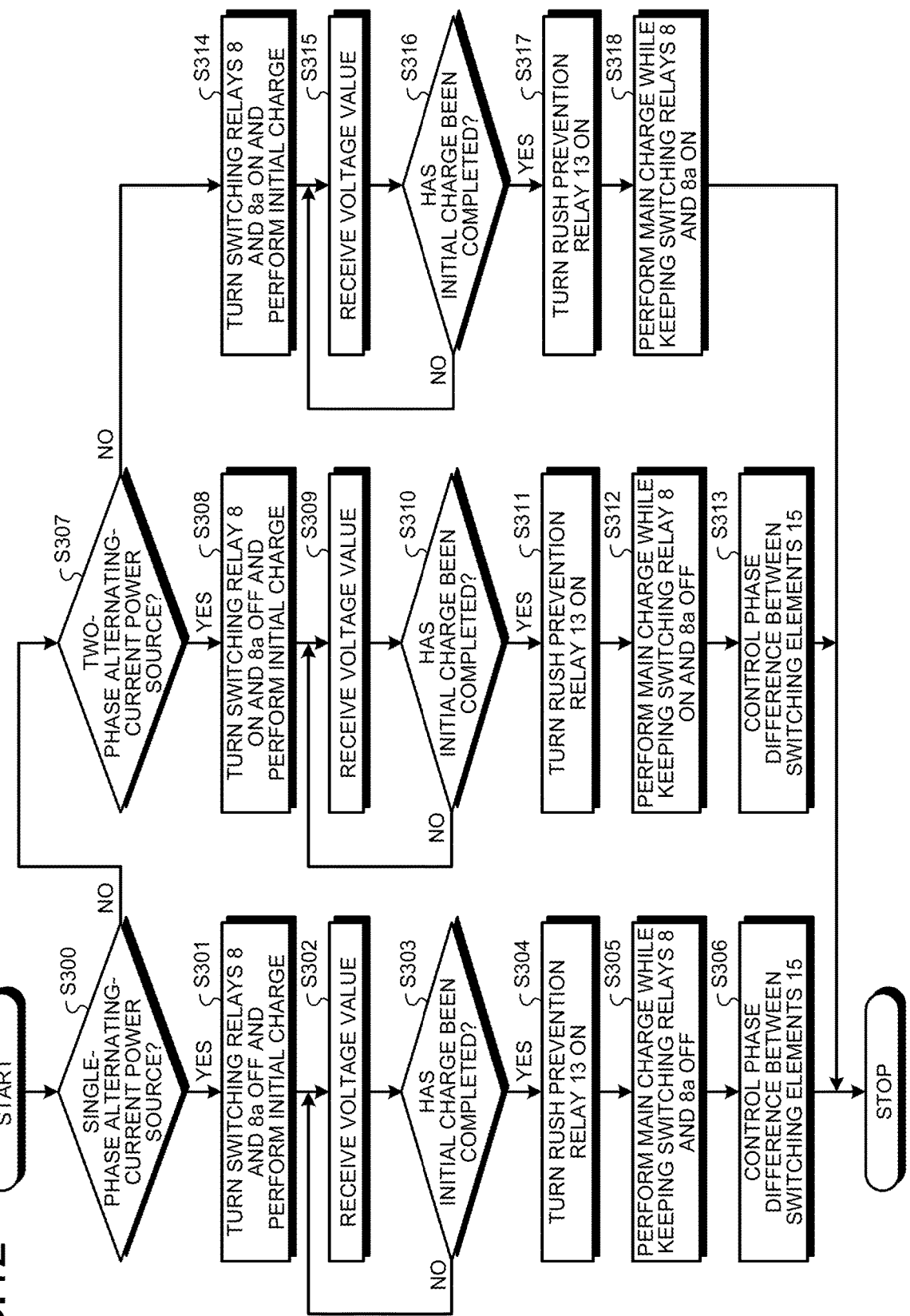
FIG. 12 is a flowchart illustrating an operation example of a switching power source device according to a modified example of the second embodiment.

The switching power source device 200 may perform an operation illustrated in FIG. 12, in place of the operation described in the second embodiment with reference to FIG. 11. FIG. 12 is a flowchart illustrating an operation example of the switching power source device 200 according to a modified example of the second embodiment.

First of all, the control unit 17 determines the specification of a connected alternating-current power source. Specifically, the control unit 17 determines whether an alternating-current power source is the single-phase alternating-current power source 10a or not (Step S300). In this point, the modified example is different from the second embodiment in which it is determined whether or not an alternating-current power source is the single-phase alternating-current power source 10a or the two-phase alternating-current power source 10b.

In a case where the switching power source device 200 is connected to the single-phase alternating-current power source 10a (in a case of Yes in Step S300), the control unit 17 switches both of the switching relays 8 and 8a off and performs initial charge (Step S301).

With this configuration, even in a case where the switching power source device 200 is connected to the single-phase alternating-current power source 10a, initial charge of the capacitors 5 respectively included in the power source circuits 1a to 1c can be performed.

Note that, in Step S301, it is preferable to control the switching relays 8 and 8a at different timings. This is because, if switching the switching relays 8 and 8a off simultaneously, a rush current increases.

Because Steps S302 to S304 are similar to Steps S202 to S204, the description will be omitted. After the initial charge of the capacitor 5 has been completed, the rush prevention relay 13 is switched on (Step S304).

Then, the control unit 17 performs charge (main charge) of the battery 20 while maintaining the switching relays 8 and 8a in the off state (Step S305). In other words, in a case where the single-phase alternating-current power source 10a is connected to the switching power source device 200, the control unit 17 brings the rush prevention relay 13 of the rush current prevention circuit 12 into a conductive state, while power source circuits corresponding to excess (for example, both of the power source circuits 1b and 1c) remain connected to the specific phase (power line L1).

By performing charge of the battery 20 while putting the switching relays 8 and 8a in the off state, the battery 20 is charged while not only the filter circuit 2 included in the power source circuit 1a but also the filter circuit 2 included in each of the power source circuits 1b and 1c remain connected to the single-phase alternating-current power source 10a. Therefore, as compared with a case where charge is performed using only the filter circuit 2 included in the power source circuit 1a, noise reduction performance can be significantly enhanced.

Furthermore, after Step S305, the processing proceeds to Step S306. In Step S306, the power factor improvement control unit 18 controls a phase difference between the switching element 15 provided in the power source circuit 1a, the switching element 15 provided in the power source circuit 1b, and the switching element 15 provided in the power source circuit 1c, to be 120 degrees (Step S306).

By the power factor improvement control unit 18 controlling the switching element 15 provided in the power source circuit 1a, the switching element 15 provided in the power source circuit 1b, and the switching element 15 provided in the power source circuit 1c by providing a phase difference in this manner, in a case where the switching circuit 7 is controlled in the first mode and the switching circuit 7a is controlled in the third mode, it is possible to further reduce a ripple current as described above, and obtain an effect superior to that of the conventional interleave method.

In a case where the switching power source device 200 is not connected to the single-phase alternating-current power source 10a (in a case of No in Step S300), it is determined whether or not the switching power source device 200 is connected to the two-phase alternating-current power source 10b (Step S307).

In a case where the switching power source device 200 is connected to the two-phase alternating-current power source 10b (in a case of Yes in Step S307), the control unit 17 performs initial charge after switching the switching relay 8a off while keeping the switching relay 8 on (Step S308).

Because Steps S309 to S311 are similar to Steps S302 to S304, the description will be omitted. After the initial charge of the capacitor 5 has been completed, the rush prevention relay 13 is switched on (Step S311).

Then, the control unit 17 performs charge (main charge) of the battery 20 while maintaining the switching relay 8 in the on state, and the switching relay 8a in the off state (Step S312). In other words, in a case where the two-phase alternating-current power source 10b is connected to the switching power source device 200, the control unit 17 brings the rush prevention relay 13 of the rush current prevention circuit 12 into a conductive state, while power source circuits corresponding to excess (for example, the power source circuit 1c) remain connected to the specific phase (power line L1).

Furthermore, after Step S312, the processing proceeds to Step S313. In Step S313, the power factor improvement control unit 18 controls a phase difference between the switching element 15 provided in the power source circuit 1a and the switching element 15 provided in the power source circuit 1c, to be 180 degrees (Step S313).

By the power factor improvement control unit 18 controlling the switching element 15 provided in the power source circuit 1a and the switching element 15 provided in the power source circuit 1c by providing a phase difference in this manner, in a case where the switching circuit 7 is in the second mode and the switching circuit 7a is in the third mode, it is possible to reduce a ripple current as described above, and obtain an effect similar to that of the conventional interleave method. Alternatively, in Step S312, the switching relay 8 may be put in the off state (first mode) and the switching relay 8a may be put in the on state (fourth mode), and a similar effect can be obtained also in this case.

Further, in a case where the switching power source device 200 is connected to the three-phase alternating-current power source (in a case of No in Step S307), the control unit 17 performs initial charge while maintaining the switching relays 8 and 8a in the on state (Step S314).

Steps S315 to S317 are similar to Steps S302 to S304. Then, if the control unit 17 switches the rush prevention relay 13 on in Step S317, the control unit 17 performs charge (main charge) of the battery 20 while maintaining the switching relays 8 and 8a in the on state (Step S318).

Heretofore, a modified example of an operation of the switching power source device 200 has been described.

MODIFIED EXAMPLE 2 OF OPERATION OF SWITCHING POWER SOURCE DEVICE 200

The switching power source device 200 may control the switching relay 8 in accordance with a power value input to the switching power source device 200. A specific operation is performed by modifying the operation in S105 of FIG. 6 as follows. In S105 of FIG. 6, main charge is performed while keeping the switching relay 8 off, but in a case where a power value is equal to or smaller than a predetermined value, main charge may be performed after turning the switching relay 8 on. In a case where a power value is equal to or smaller than the predetermined value, because a rate of a reactive current flowing in the filter circuit 2, with respect to input power becomes larger, a power factor of the switching power source device 200 consequently worsens. Accordingly, at the time of low output with a voltage value equal to or smaller than the predetermined value, the switching relay 8 is turned on and the filter circuit 2 is separated from the power line L1. By such control, in a case where power input to the switching power source device 200 is low power, it is possible to reduce a rate of a reactive current flowing in the filter circuit 2, and enhance a power factor. Furthermore, because switching noise is smaller when power is low than that when power is high, the influence on noise performance is small. Moreover, also in the switching relay 8 in S205 of FIG. 11 and S305 of FIG. 12, and the switching relay 8a in S305 and S312 of FIG. 12, similarly to S105 of FIG. 6 described above, the switching relay 8 may be controlled in accordance with a power value of input power of the switching power source device 200. By such control, it becomes possible to improve a power factor without reducing noise performance, when the switching power source device 200 is connected to the single-phase alternating-current power source 10a or the two-phase alternating-current power source 10b, and input power to the switching power source device 200 is low power.

Note that a switching operation of the switching relay 8 or the switching relay 8a of the switching power source device 200 may be performed using a voltage value measured by the voltmeter 6, in place of a power value. More specifically, by separating the filter circuit 2 from the power line L1 in a case where a voltage value measured by the voltmeter 6 is equal to or smaller than a predetermined value, it is possible to reduce a rate of a reactive current, and consequently enhance a power factor of the switching power source device 200.

Heretofore, embodiments of the present disclosure have been described, but the present disclosure is not limited to the above-described embodiments, and various changes can be made without departing from the gist of the present invention.

For example, in the above-described embodiment, a case where the power source circuit 1a, the power source circuit 1b, and the power source circuit 1c are connected to the power line L1 (specific phase) when initial charge of the capacitors 5 is performed has been exemplarily described, but the present disclosure is not limited to this. For example, when initial charge of the capacitors 5 is performed, the power source circuit 1a, the power source circuit 1b, and the power source circuit 1c may be connected to the power line L2 or the power line L3.

In other words, when initial charge of capacitors is performed, it is only required that a plurality of power source circuits (the power source circuits 1a to 1c) is connected between a specific phase (power line L1) and the neutral point n1. Furthermore, the number of power source circuits (the power source circuits 1a to 1c) is only required to be a plural number equal to or larger than two. A polyphase alternating-current power source is not limited to the two-phase alternating-current power source 10b or the three-phase alternating-current power source 10c, and is only required to be polyphase equal to or larger than two phases.

According to the present disclosure, it is possible to suppress the upsizing of a device without increasing a ripple current.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A switching power source device comprising:
 a plurality of power source circuits corresponding to phases of a polyphase alternating-current power source being an external power source, each of the plurality of power source circuits including a power factor improvement circuit including an inductor, a switching element, and a diode, the plurality of power source circuits including a first power source circuit corresponding to a first phase of the external power source, and a second power source circuit corresponding to a second phase of the external power source that is different from the first phase;
 a first switching circuit capable of switching between a plurality of connection modes including a first mode of connecting the second power source circuit to the first phase in parallel with the first power source circuit, and a second mode of connecting the second power source circuit to the second phase;
 a memory; and
 a hardware processor coupled to the memory, the hardware processor being configured to:
  open and close a switching element included in the first power source circuit and a switching element included in the second power source circuit, in different phases in the first mode; and
  operate the switching element of the first power source circuit and the switching element of the second power source circuit with a phase difference of 180 degrees in a case where the hardware processor controls the first switching circuit to be in the first mode.

2. The switching power source device according to claim 1, wherein the hardware processor further configured to switch the first switching circuit between the first mode and the second mode in accordance with a number of phases of an external power source connected to the switching power source device.

3. The switching power source device according to claim 2, wherein the hardware processor is configured to switch the first switching circuit to the first mode in a case where a single-phase alternating-current power source is connected to the switching power source device.

4. The switching power source device according to claim 2, wherein
each of the plurality of power source circuits further includes a voltmeter, and
the hardware processor is configured to determine the number of phases of the external power source connected to the switching power source device, based on a voltage value measured by the voltmeter.

5. The switching power source device according to claim 2, wherein
the plurality of power source circuits further includes a third power source circuit including a power factor improvement circuit including an inductor, a switching element, and a diode, and corresponding to a third phase of the external power source that is different from the first phase and the second phase, and
the switching power source device further comprising a second switching circuit configured to switch whether to connect the third power source circuit in parallel with the first power source circuit and the second power source circuit, or connect the third power source circuit to the third phase.

6. The switching power source device according to claim 5, wherein the hardware processor is configured to control the second switching circuit to connect the third power source circuit to the first phase in parallel with the first power source circuit and the second power source circuit in a case where a single-phase alternating-current power source is connected to the switching power source device.

7. The switching power source device according to claim 6, wherein the hardware processor is configured to control the first switching circuit and the second switching circuit at different timings.

8. The switching power source device according to claim 5, wherein the hardware processor is configured to operate the switching element of the first power source circuit, the switching element of the second power source circuit, and the switching element of the third power source circuit with a phase difference of 120 degrees in a case where the hardware processor controls the first switching circuit to be in the first mode, and controls the second switching circuit to connect the third power source circuit in parallel with the first power source circuit and the second power source circuit.

9. The switching power source device according to claim 1, wherein
each of the plurality of power source circuits further includes a filter circuit, and
the filter circuit is provided between the external power source and the power factor improvement circuit.

10. A vehicle comprising a switching power source device, the switching power source device including:
a plurality of power source circuits corresponding to phases of a polyphase alternating-current power source being an external power source, each of the plurality of power source circuits including a power factor improvement circuit including an inductor, a switching element, and a diode, the plurality of power source circuits including a first power source circuit corresponding to a first phase of the external power source, and a second power source circuit corresponding to a second phase of the external power source that is different from the first phase;
a first switching circuit capable of switching between a plurality of connection modes including a first mode of connecting the second power source circuit to the first phase in parallel with the first power source circuit, and a second mode of connecting the second power source circuit to the second phase;
a memory; and
a hardware processor coupled to the memory, the hardware processor being configured to:
open and close a switching element included in the first power source circuit and a switching element included in the second power source circuit, in different phases in the first mode; and
operate the switching element of the first power source circuit and the switching element of the second power source circuit with a phase difference of 180 degrees in a case where the hardware processor controls the first switching circuit to be in the first mode.

11. A control method to be executed by a switching power source device including a plurality of power source circuits and a first switching circuit,
the plurality of power source circuits corresponding to phases of a polyphase alternating-current power source being an external power source,
each of the plurality of power source circuits including a power factor improvement circuit including an inductor, a switching element, and a diode, and the plurality of power source circuits including a first power source circuit corresponding to a first phase of the external power source, and a second power source circuit corresponding to a second phase of the external power source that is different from the first phase,
the first switching circuit being capable of switching between a plurality of connection modes including a first mode of connecting the second power source circuit to the first phase in parallel with the first power source circuit, and a second mode of connecting the second power source circuit to the second phase,
the control method comprising:
opening and closing a switching element included in the first power source circuit and a switching element included in the second power source circuit, in different phases in the first mode; and
operating the switching element of the first power source circuit and the switching element of the second power source circuit with a phase difference of 180 degrees in a case where the first switching circuit is in the first mode.

* * * * *